(12) United States Patent
Wang et al.

(10) Patent No.: US 8,539,064 B1
(45) Date of Patent: Sep. 17, 2013

(54) ANALYSIS OF ENCRYPTED STREAMING MEDIA TRAFFIC

(75) Inventors: Tianlin Wang, Hillsboro, OR (US); Christopher Waters, Los Altos, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 830 days.

(21) Appl. No.: 11/520,001

(22) Filed: Sep. 12, 2006

Related U.S. Application Data (60) Provisional application No. 60/717,020, filed on Sep. 13, 2005.

(51) Int. Cl.
*G06F 15/173* (2006.01)
*H04L 12/26* (2006.01)

(52) U.S. Cl.
USPC .......................................... 709/224; 370/252

(58) Field of Classification Search
USPC .......... 370/241–253; 709/223–226, 230–244
See application file for complete search history.

(56) References Cited

U.S. PATENT DOCUMENTS

| | | | |
|---|---|---|---|
| 6,990,513 B2 * | 1/2006 | Belfiore et al. ............... | 709/203 |
| 2002/0016937 A1 * | 2/2002 | Houh .............................. | 714/43 |
| 2004/0057389 A1 * | 3/2004 | Klotz et al. ................... | 370/252 |
| 2005/0025181 A1 * | 2/2005 | Nazari .......................... | 370/469 |
| 2006/0190594 A1 * | 8/2006 | Jorgenson et al. ............ | 709/224 |
| 2006/0271485 A1 * | 11/2006 | McKenzie et al. .............. | 705/51 |

* cited by examiner

*Primary Examiner* — Afshawn Towfighi
(74) *Attorney, Agent, or Firm* — Blakely, Sokoloff, Taylor & Zafman LLP (57) ABSTRACT

A method of analyzing streaming media traffic comprises intercepting a data stream that is at least in part encrypted, observing a characteristic associated with the data stream, deriving, based at least in part on the characteristic associated with the data stream, a characteristic associated with an IP telephony session.

16 Claims, 8 Drawing Sheets

| Codec | Default data rate | Possible time interval between packets | Typical time interval | Time interval step | Voice payload size per step |
|---|---|---|---|---|---|
| G711u | 64kbps | 10/20/30/40/50/60 ms | 20/30 ms | 10 ms | 80bytes/10ms |
| G711a | 64kbps | 10/20/30/40/50/60 ms | 20/30 ms | 10 ms | 80bytes/10ms |
| G729 | 8kbps | 10/20/30/40/50/60 ms | 20 ms | 10 ms | 10bytes/10ms |
| G723.1 MPMLQ | 6.3kbps | 30/60 ms | 30 ms | 30 ms | 24bytes/30ms |
| G723.1 ACELP | 5.3kbps | 30/60 ms | 30 ms | 30 ms | 20bytes/30ms |

| Codec | Packetization delay[1] | Default jitter buffer delay | Theoretical maximum MOS |
|---|---|---|---|
| G711u | 1.5ms | 40ms | 4.4 |
| G711a | 1.5ms | 40ms | 4.4 |
| G729 | 15.0ms | 40ms | 4.07 |
| G723.1 MPMLQ | 37.5ms | 60ms | 3.87 |
| G723.1 ACELP | 37.5ms | 60ms | 3.69 |

ANALYSIS OF ENCRYPTED STREAMING MEDIA TRAFFIC

CROSS REFERENCE TO OTHER APPLICATIONS

This application claims priority to U.S. Provisional Patent Application No. 60/717,020 entitled ANALYSIS OF VOICE OVER WIRELESS TRAFFIC IN ENCRYPTED STREAMS filed Sep. 13, 2005 which is incorporated herein by reference for all purposes.

BACKGROUND OF THE INVENTION

Internet Protocol (IP) based media streaming is becoming more extensively deployed. Applications such as voice over IP (VoIP) allow users to place phone calls over enterprise networks as well as the Internet.

There are various existing tools for analyzing the quality of unencrypted VOID traffic. The conventional tools, however, typically cannot analyze encrypted traffic, such as traffic on an encrypted wireless network since it is usually difficult to decrypt the traffic without access to the encryption keys. It would be desirable to have a way of analyzing encrypted streaming media traffic, in particular traffic across a wireless network. It would also be useful if the analysis does not require decrypting the traffic.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of analyzing encrypted streaming media traffic is disclosed. The technique described is applicable to various data stream types, including Real Time Protocol (RTP) based data streams such as VoIP traffic and video (e.g. MPEG) over IP traffic. In some embodiments, a data stream that is at least in part encrypted is intercepted, and a characteristic associated with the data stream is observed. The observed characteristic may indicate, for example, packet lengths, packet arrival time, repetition of packets, addresses of devices that are transmitting and receiving data, etc.

Based on the characteristic associated with the data stream, a characteristic associated with an IP telephony session is derived. Examples of the derived characteristic may indicate, for example, specific devices that are engaged in an IP telephony call session (i.e. the devices are exchanging audio, image, video, and/or other data based on a streaming protocol such as VoIP), the initialization and termination of an IP telephony session, the codec used to encode/decode analog signals, the performance/quality of the IP telephony session, and various other aspects of the IP telephony session that are not necessarily directly observable in an encrypted data stream. In some embodiments, multiple IP telephony sessions are identified and their characteristics are aggregated to provide information about the network.

Figure 1:
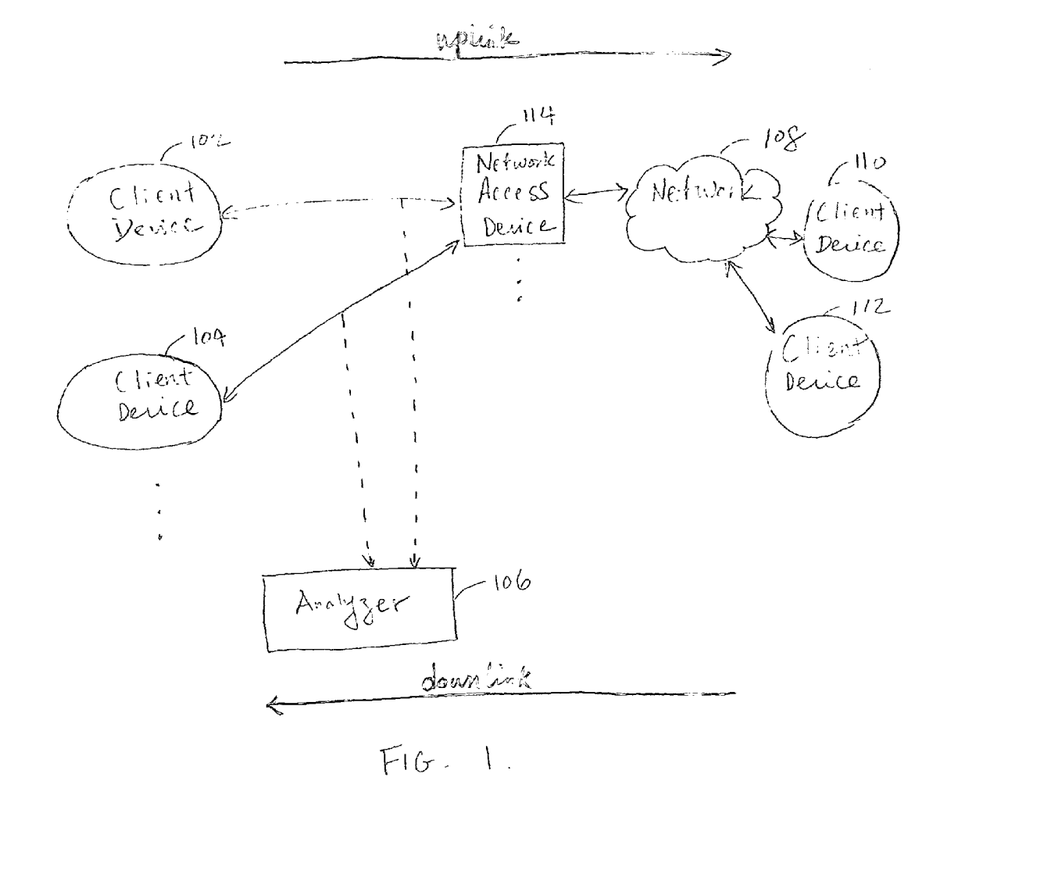
FIG. 1 is a block diagram illustrating an embodiment of an IP telephony network.

FIG. 1 is a block diagram illustrating an embodiment of an IP telephony network. In the example shown, client devices such as 102 and 104 send data to and receive data from a network 108 via a network access device 114. Some examples of the client devices include VoIP phones, Wireless Fidelity (WiFi) enabled personal digital assistants (PDAs), etc. Examples of the network access device include wireless access points (APs). Network 108 may be the Internet, a local area network (LAN), a wide area network (WAN), or any other appropriate network.

The client devices establish communication sessions to exchange data with other client devices such as client devices 110 and 112 over the network. For example, client device 102 may be a wireless voice/video over IP phone and client device 110 may be a computer running appropriate voice/video over IP software. For purposes of example, VoIP enabled wireless devices are discussed extensively, although the techniques discussed are also applicable to other types of devices capable of supporting streaming media traffic.

During initialization, caller client device 102 makes a session request to callee client device 110 by dialing a phone number, an IP address or some other appropriate identifier associated with device 110. A handshake process takes place between the devices. If the callee accepts the call, the caller device will receive a response from the callee device indicating that the request is accepted, and a communication session is established and the users can make a VoIP call. It is also possible that the caller/callee roles are switched in some sessions.

To transmit voice or image over the network, analog signals such as sound and light are encoded into digital signals. The digital signal received is then decoded back into analog so that it can be perceived by the user. In some embodiments, the encoding and decoding is carried out by the client devices using a codec selected at initialization time, according to a protocol such as the Session Initialization Protocol (SIP). Examples of the codec include G711u, G11a, G729, G723.1 MPMLQ, G723.1 ACELP, etc. The digital signals transmitted between the client devices are encrypted.

In this example, an analyzer 106 has access to the physical medium between the local client devices (such as 102 and 104) and the network access device, and is capable of intercepting the data streams for further processing. The analyzer includes a radio receiver that allows the analyzer to intercept the wireless signals and demodulate the signals to obtain the data packets (also referred to as data frames) exchanged between the devices in real-time. In some embodiments, the analyzer obtains the encrypted data stream from other sources such as a stream capture device that records and stores the data stream. The analyzer performs post analysis on the data stream. As will be shown in detail below, analyzer 106 is configured to monitor and analyze the encrypted data streams to determine characteristics associated with the communication sessions.

Figure 2A:
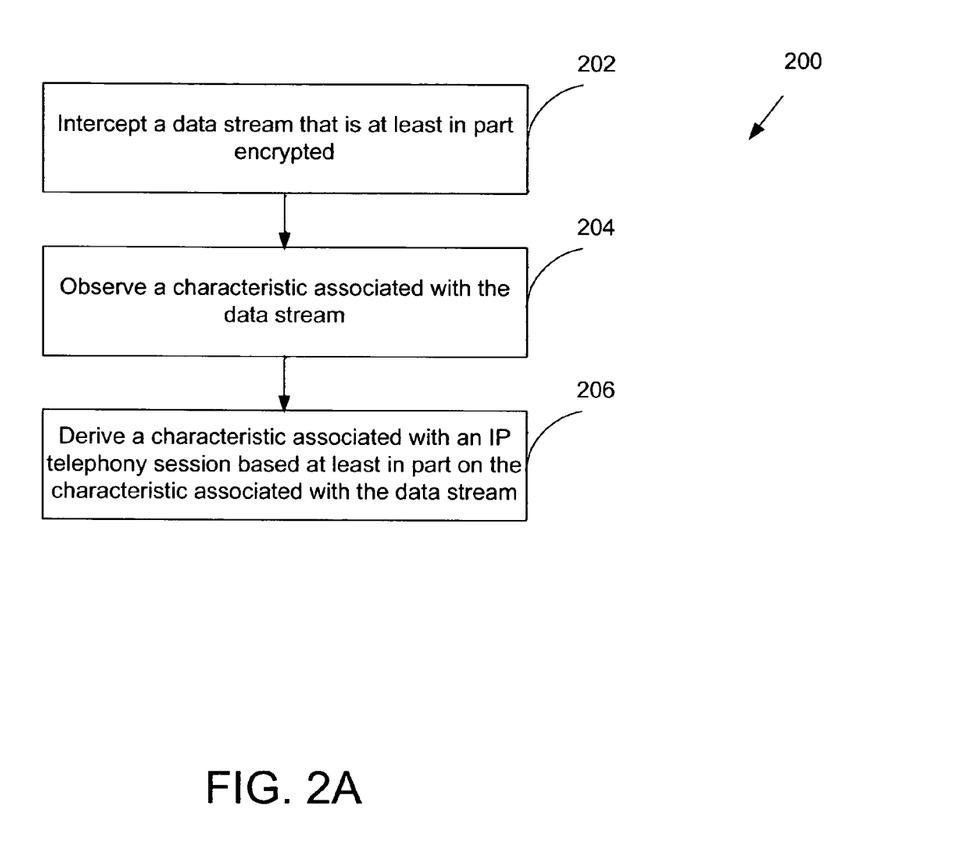
FIG. 2A is a flowchart illustrating an embodiment of a process for analyzing IP telephony traffic.

FIG. 2A is a flowchart illustrating an embodiment of a process for analyzing IP telephony traffic. This process may be implemented on analyzer 106. In the example shown, process 200 begins when a data stream that is at least in part encrypted is intercepted (202). A characteristic associated with the data stream is observed (204). In some embodiments, the observation is made by taking measurements of the data stream and/or by reading portions of the data packets without decrypting them. The observed characteristics may indicate, for example, packet lengths, frequency of arrival, repeated patterns, the loss of certain expected data such as an acknowledgment (ACK) packet, the retransmission of certain packets, etc.

Based at least in part on the observed characteristic that is associated with the data stream, a characteristic associated with an IP telephony session is derived (206). Numerous IP telephony session characteristics that are not necessarily directly observable from the data stream can be derived based on the data stream's characteristic(s). Several examples of the characteristics are described below.

Figure 4:
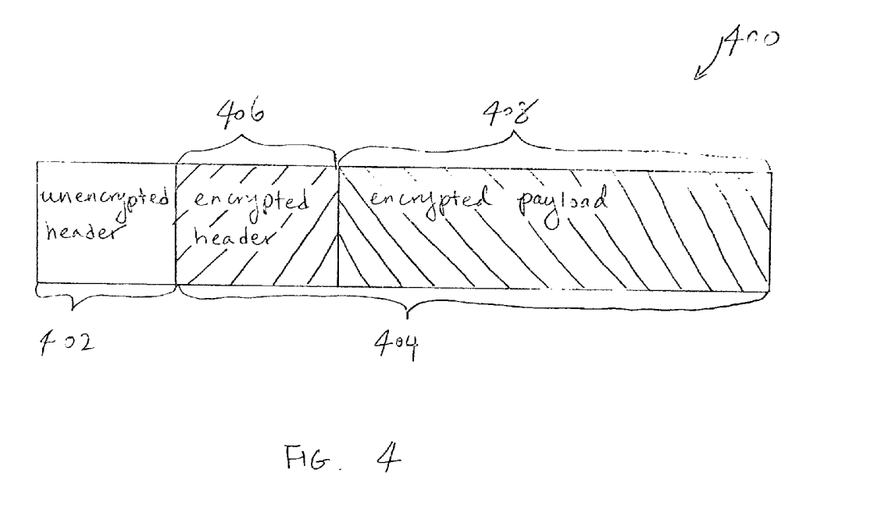
FIG. 4 is a diagram illustrating an example of an encrypted IP telephony data packet.

In some embodiments, deriving a characteristic associated with the IP telephony session includes identifying the session in the data stream. It is useful to examine the format of an encrypted IP telephony data packet before proceeding further. FIG. 4 is a diagram illustrating an example of an encrypted IP telephony data packet. For purposes of illustration, packet 400 is shown to be an IEEE 802.11 data packet, although other types of data packets can be processed as well. In the example shown, packet 400 includes an unencrypted portion 402 and an encrypted portion 404. The unencrypted portion includes a MAC header formatted according to the IEEE 802.11 standard. The MAC header, which has a fixed length, includes fields such as frame control, sequence control, the MAC addresses of the source device and the destination device. The frame control further includes subfields indicating the packet type, whether the packet is received from or sent to the distribution system/network access device, whether the packet is a retransmitted packet, whether the packet is encrypted, etc. The actual fields and their locations depend on the protocol used.

The encrypted portion, which is encrypted according to the Wired Equivalent Privacy (WEP) scheme in this example, includes a protocol header portion 406 and a data payload portion 408. The encrypted protocol header portion includes the Logical Link Control (LLC), Internet Protocol (IP), User Data Protocol (UDP), Real-time Transport Protocol (RTP) headers. The data payload portion includes encrypted, encoded streaming media data. For packets encrypted using a particular encryption scheme, the length of the encrypted protocol header portion is fixed. For example, in WEP encrypted IP telephony sessions, the packet overhead is 115 bytes and the size of the data payload equals (packet size— 115) bytes.

Figure 2B:
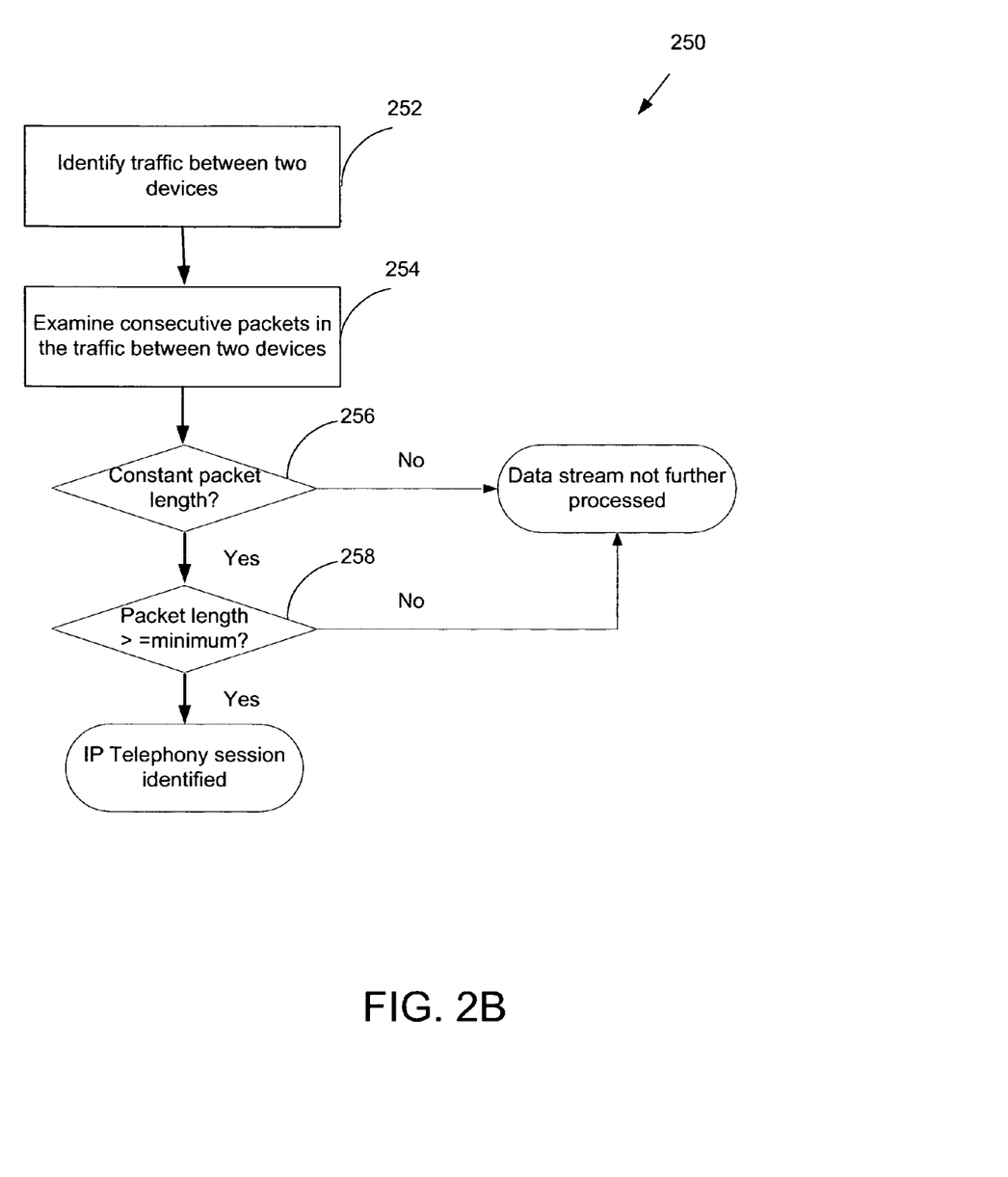
FIG. 2B is a flowchart illustrating an embodiment of a process for identifying an IP telephony session.

FIG. 2B is a flowchart illustrating an embodiment of a process for identifying an IP telephony session. Process 250 may be implemented on the analyzer. In the example shown, the process starts by identifying the traffic between two devices (252). As shown in FIG. 4, in encrypted IP telephony data packets, there is an unencrypted header portion that includes the MAC addresses of the source and the destination devices. Thus, traffic between two devices is identified by locating packets that include the same MAC addresses in their headers. Since the traffic is bidirectional and certain characteristics may be different for the uplink stream and the downlink stream. For purposes of clarity, in the following discussion, it is assumed that the traffic in each direction is identified and processed separately, although it is also possible to process the traffic in both directions together.

A number of consecutive sample packets sent between the two devices are examined (254). In this example, the sample packets are selected according to the frame control field in the header. Only data frames are selected while management and control frames such as the beacon, broadcast, ACK, and probe related frames are excluded. The number of consecutive sample packets used is implementation dependent. 10 sample packets are examined in one example.

It is determined whether the consecutive packets have a constant packet length (256). If these consecutive packets do not have a constant packet length, the data stream is deemed not to be real-time traffic and therefore is not IP telephony traffic. The data stream is not further processed and the process may optionally perform exception handling such as generating an error log. If, however, the consecutive sample packets have a constant packet length, the data stream is deemed to be real-time traffic and the packet length is compared with a predefined minimum length (258). The minimum is set to 600 bytes in one embodiment. If the packet length is less than the minimum length, it is deemed not to be IP telephony traffic and the data stream is not further processed. If, however, the packet length is greater than or equal to the minimum length, it is deemed to be IP telephony traffic of interest.

In some embodiments, in addition to identifying the IP telephony session, the start time of the session is recorded based on the earliest IP telephony session packet observed. The IP telephony session is continuously monitored until the session ends. The session is deemed to have ended when data packets associated with the session, in particular packets with MAC addresses that correspond to the session, are no longer observed by the analyzer. Alternatively, a session is deemed to have ended when certain call quality characteristic falls below a threshold. Session duration can be calculated based on the start and termination time.

Data Rate and Codec

Figure 3:
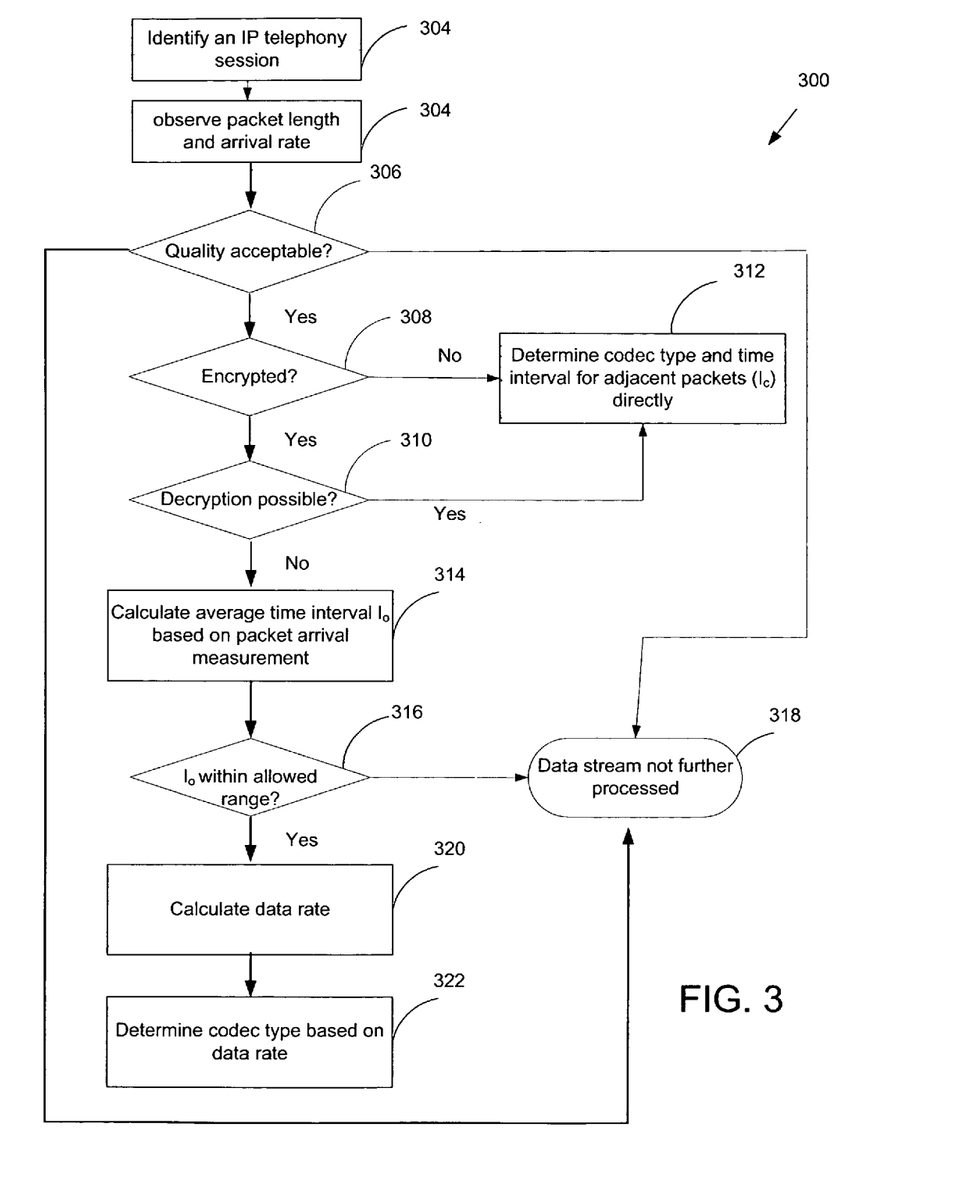
FIG. 3 is a flowchart illustrating an embodiment of a process for deriving the data rate and codec associated with an IP telephony session.

FIG. 3 is a flowchart illustrating an embodiment of a process for deriving the data rate and codec associated with an IP telephony session. Process 300 shown in this example may be implemented by analyzer 106. Based on packet length and rate of arrival observation of the data stream, process 300 derives characteristics associated with the IP telephony session including the time interval between adjacent packets and the codec used.

The process starts by identifying an IP telephony session in the packet stream (304). The length and arrival rate of packets in the data stream that correspond to the IP telephony session are observed (305). The quality of the IP telephony session is examined to determine whether it is acceptable (306). In this example, the arrival rate is used to determine whether the IP telephony session is of acceptable quality. The number of data packets arrived within a first time period is compared with the number of data packets arrived within a second time period of the same duration. If the difference is greater than some predefined threshold (for example, 50%), the quality is determined to be unacceptable and the stream is not further processed (318). Otherwise, the data packets are examined to determine whether they are encrypted (308). The process further attempts to decrypt encrypted data packets by, for example, trying to locate a decryption key (310). The codec used in an unencrypted or decrypted data stream is directly determined by extracting the "payload type" field in the data packet (312). The time interval between adjacent packets (denoted as $I_c$) is also directly determined by calculating the delta between the arrival times of packets with consecutive sequence numbers (312).

If, however, the data stream is encrypted and the decryption key is not available, an average time interval $I_o$ is computed based on packet arrival measurement (314). The following equation describes how to compute $I_o$:

$$I_o = \frac{\text{time\_span}}{\text{number\_of\_packets\_received\_within\_this\_time\_span} - 1},$$

where time_span is the amount of time between when the first and the last of the packets are received.

If $I_o$ is within an allowed range (316), the data stream is deemed to be of acceptable quality and certain characteristics associated with the IP telephony session such as data rate and codec used can be determined. For example, some of the commonly used codecs specify time intervals of 10, 20, 30, 40, 50, or 60 ms. $I_o$ is deemed to be with in an allowed range if $I_o$ is reasonably close to any of the time interval values. The determination of whether is within $I_o$ range depends on implementation. In some embodiments, $I_o$ is deemed to be within range if the difference between $I_o$ and a specified time interval is no greater than a few percent of the time interval value. If $I_o$ is not within an allowed range, it indicates that the data stream is of poor quality and is not further processed (318).

For an IP telephony session having an $I_o$ within an allowed range, its data rate is computed in step 320 according to the following equation:

$$\text{data\_rate} = \frac{\text{data\_payload\_size}}{I_o}$$

Figure 5:
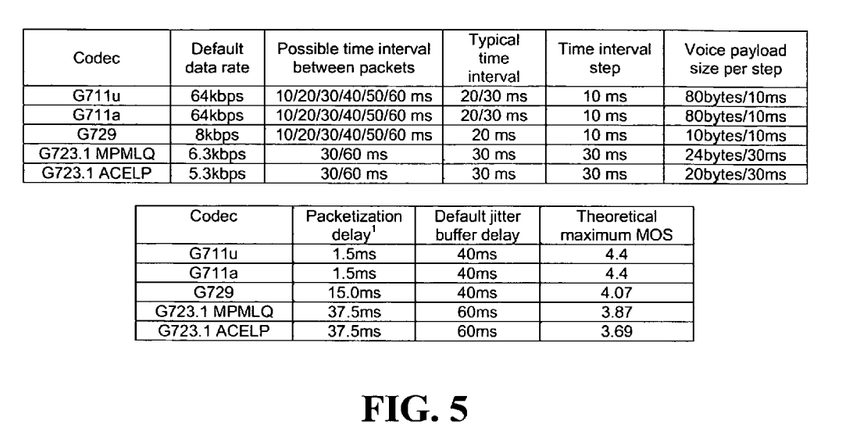
FIG. 5 is a table listing the properties of several commonly used codecs in VoIP applications.

The codec type is determined based on the data rate. In some embodiments, the determination is made using a table lookup. FIG. 5 is a table listing the properties of several commonly used codecs in VoIP applications. Some of the properties in the table, such as data rate or voice payload per step size can be used to identify the corresponding codec type. For example, a data rate of approximately 64 kbps indicates that the coded used is the G711 codec. Additional entries may be generated for different codecs. Similar tables can be created for other protocols.

Packet Loss

In some embodiments, packet loss associated with the streaming media session is determined based on the measurement of packets received and the determination of the codec used. For unencrypted data, packet loss can be determined by counting the sequence number in the data traffic. Non-consecutive sequence numbers indicate that certain packets are lost. For encrypted data, since the sequence number of the packet is not plainly visible, one way to estimate packet loss is based on the actual time interval ($I_o$) and the time interval specified by the codec ($I_c$). In some embodiments, packet loss (in percentage) is computed according to the following equation:

$$\text{Packet\_Loss} = \frac{I_o I_c}{I_o} = \frac{(\text{time\_span}/I_c + 1) - (\text{number\_of\_packets\_received})}{\text{time\_span}/I_c + 1}.$$

Figure 6:
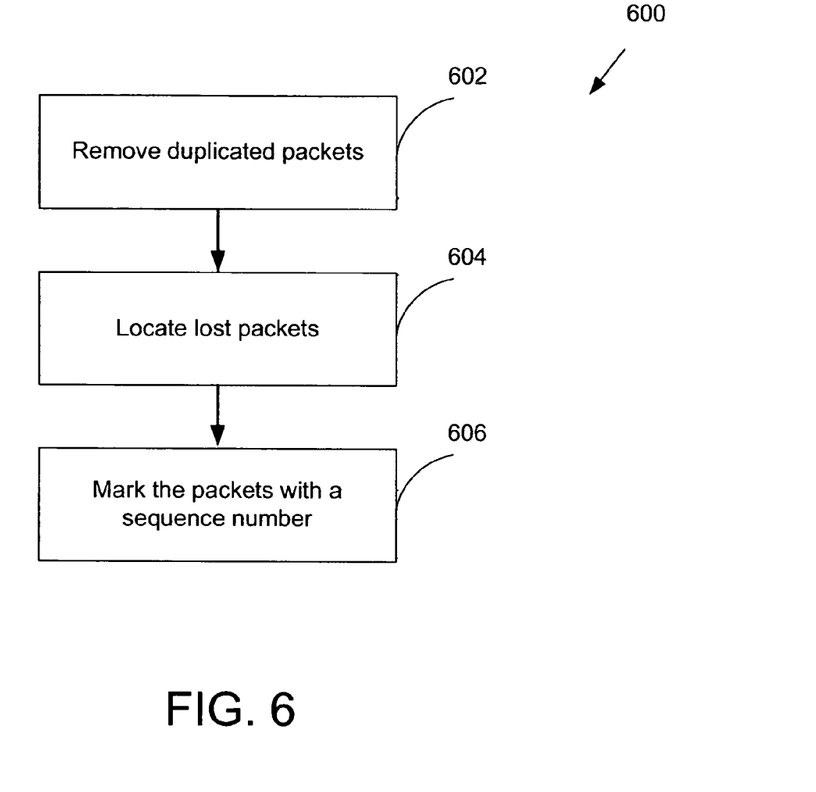
FIG. 6 is a flowchart illustrating an embodiment of a process implementing the mark function.

In some embodiments, packet loss is derived using a mark function. FIG. 6 is a flowchart illustrating an embodiment of a process implementing the mark function. In a data stream, there are sometimes duplicated packets. The duplicates result from packet retransmission when the ACK frames are not received, as well as lost packets due to transmission error. In this example, process 600 begins by removing duplicates from a sequence of intercepted packets (602). Lost packets are located (604). The packets in the resulting sequence are marked with a sequence number (606).

One way to identify the duplicates and the lost packets is by comparing the difference in the arrival time of adjacent packets (denoted as $\Delta R$). If two adjacent packets are identical, and their $\Delta R$ is less than ¼ of $I_c$, the second packet is deemed to be a duplicate and is removed. If the $\Delta R$ of two adjacent received packets is greater than $1.5 I_c$, there is one packet lost between them. If the $\Delta R$ of two adjacent received packets is greater than $2.5 I_c$, there are two packet lost between them. More generally, if the $\Delta R$ of two adjacent received packets is greater than $(1+2j)/2 I_c$, then there are j packets lost between them. A placeholder is inserted in the packet sequence to represent each of the lost packets. When marking the sequence with sequence numbers, each of the packets and the placeholders receives a sequence number. Accordingly, the rate of packet loss is the following:

$$\text{Packet\_Loss} = \frac{\text{number\_of\_packets\_received}}{\text{number\_of\_packets\_Expected}} = \frac{\text{number\_of\_packets\_received}}{\text{highest\_sequence\_number} - \text{lowest\_sequence\_number} + 1}$$

Jitter

As used herein, jitter refers to the difference between the expected arrival time and the actual arrival time of packets.

The amount of jitter in a data stream is typically variable. The receiving device often includes a jitter buffer for smoothing out the effects of jitter. In a network such as 100 of FIG. 1, the MAC layer and the network both contribute to jitter. In the uplink direction (e.g. from a client device such as 102 to an access point, or from device 102 to device 110), the jitter measured by the analyzer is mostly attributed to the MAC layer. In the downlink direction (e.g. from a device 110 to device 102), the jitter measured by the analyzer is the sum of MAC layer jitter and network jitter.

In some embodiments, jitter is calculated according to the following formula:

$$J_i = J_{i-1} + \frac{|\Delta D(i-1, i)| - J_{i-1}}{C},$$

where J is jitter and ΔD is the difference in delay between two packets. The constant C, set to 16 in some embodiments, serves as a filtering coefficient. Other values for C are possible in some embodiments. Furthermore, $$\Delta D(i,j) = (R_j - R_i) - (S_j - S_i) = (R_j - S_j) - (R_i - S_i) = R_j - R_i - (j-i)I_c,$$

where for packet i, $R_i$ is the observed arrival time and $S_i$ is sending time as recorded in the packet's timestamp. For two consecutive packets sent, the difference in their sending time equals $I_c$, which depends on the codec used. Based on the formula, jitter values for consecutive packets can be computed iteratively. The technique is still valid even when there is packet loss.

Take the following packets with an $I_c$ of 0.03 seconds as an example:

| Packet | Sequence | Delta ($R_j$-$R_i$, seconds) | Jitter (seconds) |
|---|---|---|---|
| 106 | 39378 | 0 | 0 |
| 107 | 39379 | 0.002983 | 0.001689 |
| 108 | 39380 | 0.006785 | 0.003034 |
| 109 | 39381 | 0.003869 | 0.004478 |
| 110 | 39382 | 0.004391 | 0.005798 |

Accordingly, $R_{108}$-$R_{107}$=0.006785, $S_{108}$-$S_{107}$=$I_c$=0.030000, |ΔD(107,108)|=0.023215, $J_{108}$=$J_{107}$+(|ΔD(107,108)|-$J_{107}$)/16=0.001689+(0.023215-0.001689)/16=0.003034.

Delay

As used here in, system delay refers to the time difference between when the analog signal is generated by the sender and when a corresponding analog signal is perceived by the recipient. In a system such as 100, the system delay includes codec delay on both devices for encoding and decoding the signals, the MAC layer delay between the client device and the network access device, the network delay, and the jitter buffer delay.

Codec Delay

The codec delay depends on which codec is used. In some embodiments, the codec delay is computed as follows:
if codec=G.711, codec_delay=$I_c$+C1;
elseif codec=G.729, codec_delay=$I_c$+C2;
elseif codec=G.723, codec_delay=$I_c$+C3, where C1, C2, and C3 are constant values. In some embodiments, the constants are determined based on empirical measurements. C1, C2, and C3 correspond to values of 1.5 ms, 15 ms, and 37.5 ms, respectively, in some embodiments.

MAC Delay

The MAC delay includes propagation delay and data link (MAC) layer delay. In practice, the propagation delay is negligible. The MAC layer delay is more significant in comparison. The MAC layer delay occurs when multiple devices compete to gain access to the MAC layer. Occasionally a client device has to "back-off" for some time to avoid collision before it can transmit.

Figure 7:
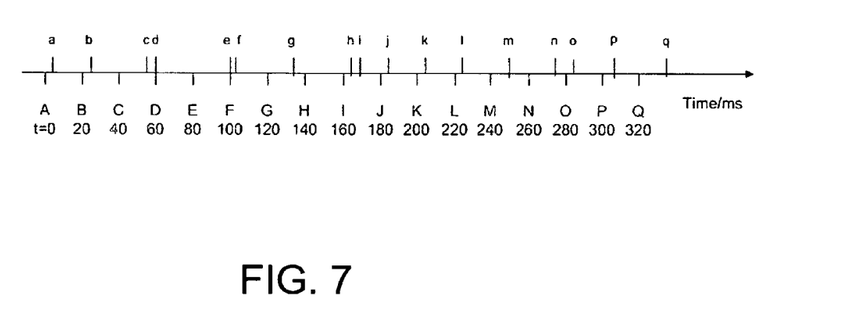
FIG. 7 is the timing diagram illustrating an embodiment of a process for deriving the MAC layer delay.

FIG. 7 is the timing diagram illustrating an embodiment of a process for deriving the MAC layer delay. In this example, upper case letters A, B, C, D, . . . Q mark the ideal arrival time of packets A, B, C, D . . . Q without any delay. These points are referred to as the reference time. Lower case letters a, b, c, d . . . q mark the actual arrival time of packets A, B, C, D . . . Q including the MAC layer delay. Packets A-Q are a string of VoIP packets encoded using the G711 codec. The time interval between two adjacent packets is 20 ms. If there is no MAC layer delay, packet A is supposed to arrive at t=0, packet B at t=20 ms, and so on. When there's competition for the MAC layer, the "back-off" algorithm used in Carrier Sense Multiple Access With Collision Avoidance (CSMA/CA) delays the packet by a random amount. If there is no competing client for the MAC after the first back-off, the distribution of the back-off time should be uniformly distributed. For example, the first packet A actually arrives at time "a", which is 4 ms later than the anticipated arrival time at time "A". To calculate the delay, a reference time is determined by locating a packet that has the least delay.

To find this reference time, N consecutive packets without packet loss and wrong sequence are selected from the intercepted packets. Let i be the packet number, and i∈[1, N]. Define a variable $T_i$, where $$T_i = \sum_{i=2}^{i} \Delta D(i-1, i) = \sum_{i=2}^{i} (R_i - R_{i-1} - I_c).$$

For all the i∈[2, N], find the minimum of $T_i$, and the corresponding packet x is the packet with lowest delay. $R_x$, therefore, is regarded as the reference point. Once the reference point is determined, the MAC delay can be calculated as follows:

$$D_i = R_i - R_x - I_c(i-x)$$

The accuracy of this algorithm depends on the value of N and the background traffic load.

Jitter Buffer Delay

In some embodiments, the jitter buffer delay is calculated as the following:

Is ($I_c$+coefficient*jitter)<=constant_value,jitter_delay=($I_c$+coefficient*jitter);else
jitter_delay=constant_value.

The coefficient is set to 0.9 and constant_value is set to be 300 ms in one embodiment.

R-Value

R-value or R factor is a performance metric used to represent the quality of the IP telephony session. International Telecommunication Union (ITU)'s Recommendation G.107 provides a detailed description for deriving the R value using the E model. A simplified E model formula is the following:

$$R\text{-value} = 93.2 - I_d - I_e$$

where $I_d$ (impairments delayed after signal transmission) and $I_e$ (effects of equipment such as the codec) are derived based on the following equations:

$$I_d = 0.024*d + 0.11*(d-u)*H(d-u),$$

where d is delay in milliseconds, u is a constant, and if d<u, then H(d−u)=0; else H(d−u)=1.

$$I_e = I_{e\_opt} + c1*\ln(1 + c2*PL),$$

where PL is the rate of packet loss, $I_{e\_opt}$, c1, and c2 are coefficients whose values depend on the codec used. A sample set of coefficients are shown as follows:

| Codec | $I_{e\_opt}$ | c1 | c2 |
|---|---|---|---|
| G.711 (PL <= 4%) | 0 | 30 | 15 |
| G.711 (PL > 4%) | 0 | 19 | 70 |
| G.729 | 11 | 40 | 10 |
| G.723 (6 kbps) | 15 | 37 | 6 |
| G.723 (5 kbps) | 19 | 37 | 5 |

MOS

Another performance metric is the mean opinion score (MOS). One way to derive the MOS based on R is the following:
For R<0: MOS=1
For 0<R<100: MOS=$1 + 0.035R + R(R-60)(100-R)*7*10^{-6}$
For R>100: MOS=4.5

Additional Characteristics

Many other characteristics associated with an IP telephony session are derived by the analyzer in various embodiments. The statistics collected can be used, among other things, to provide feedback to the system operators. For example, in some embodiments, the analyzer is configured to detect when an IP telephony session starts and ends. In some embodiments, statistics such as the number and percentage of lost packets during the session and/or over a specified period of time, the minimum, maximum, and average packet size in each direction, and other appropriate characteristics associated with the session are collected.

In some embodiments, the next hop MAC address and/or the network access device MAC address associated with the IP telephony session are determined by examining the appropriate fields in the unencrypted portion of the packet header. The next hop MAC address may correspond to a router, a private branch exchange (PBX), or some other intermediate device through which the packet is routed.

In some embodiments, characteristics associated with device roaming are detected. One way to detect roaming is by monitoring changes in the Basic Service Set Identifier (BSSID) field of the packet header. Another way to detect roaming is by aggregating multiple IP telephony sessions and identifying packets sent by the same client device via different network access devices. If the packets to and from the same device is sent via a first network access device for a period of time and then via a second network access device immediately afterwards, it indicates that it is likely that the device is roaming.

In some embodiments, the particular devices used in the IP telephony session are determined as follows: the IP telephony session, whether encrypted or unencrypted, is detected and identified using techniques such as the one described in step 304 of process 300 above. The MAC addresses in the header portion of the IP telephony sessions are mapped to a product information database that maps certain MAC addresses or address ranges to specific types of devices. For example, a MAC address prefix of 00:04:0D (i.e., an address range of 00:04:0D:00:00:00 to 00:04:0D:FF:FF:FF) indicates a device manufactured by Avaya, Inc.

In some embodiments, multiple IP telephony sessions are determined using techniques described above. The information is aggregated to obtain characteristics about the network. For example, a list of IP telephony devices currently operating can be determined by mapping the MAC address to the product information database. The number and type of client devices and/or IP telephony sessions serviced by a particular network access device can be determined by identifying sessions having the network access device's MAC address in their packet header. The throughput of a network access device can be calculated based on the aggregate data rate for the sessions flowing through the network access device. Roaming characteristics such as number of clients that are roaming, the time when roaming occurs, the network access devices servicing the roaming devices can be determined.

Troubleshooting

Poor Session Quality/No Connection

In some embodiments, the statistics determined provide ways for troubleshooting. In some embodiments, for example, when it is determined that an IP telephony session does not have good quality, the traffic burden of the network access device is determined using the number of associated clients and their throughputs. High background traffic tends to lead to performance degradation.

If, however, the background traffic is below the threshold value, the RF environment is checked to determine find if there are other wireless devices working on the same or adjacent frequency channels. If there is no unacceptable interference, the signal to noise ratio (SNR) of the client device is determined based on information such as retransmission rate and/or data rate changes. Although the analyzer typically cannot observe the received signal strength of the client device, it is possible to determine the SNR by detecting the retransmission of packets in MAC layer. Many retransmissions indicate that there may be too many clients competing for the MAC layer and causing multiple retransmissions. Furthermore, if the data rate mode changes from high data rate to low data rate, (for example, from 11 Mbps to 5.5 Mbps, 2 Mbps, and finally 1 Mbps), it indicates that the signal is fading. If the above checks indicate that the background traffic, the RF environment, and the SNR are all acceptable, it indicates that what is causing the poor quality is not located on the local network associated with the network access device, but is on the wider network such as 108 of FIG. 1.

Dropped Calls

The procedure for checking call drop is similar to what was described above for poor quality. Optionally, it is further checked whether there is handoff by determining whether the client is associated with another network access device. The traffic burden of the other network access device is determined by finding the number of its associated clients and their throughputs. If the background traffic determined is below the threshold value, the RF environment is checked to determine whether there are other client devices causing interference on the same channel or adjacent channels. If not, the SNR of the client is determined based on retransmission and data rate mode in the same manner as described above.

Analyzing streaming media traffic has been described. The techniques described are applicable to wireless, wired, and hybrid networks that support encryption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A non-transitory computer readable medium comprising instructions which, when executed by at least one hardware processor, causes performance of operations comprising:
   receiving, by a network device, a data stream comprising packets, the network device including a hardware processor;
   observing, by the receiving network device, a characteristic associated with the data stream,
   wherein observing the characteristic associated with the data stream includes determining an observed packet arrival rate ($I_o$) of the packets included in the data stream;
   deriving, by the receiving network device, based at least in part on the observed packet arrival rate ($I_o$), a codec of a plurality of codecs at least for decoding the data stream;
   decoding, by the receiving network device, the data stream using the derived codec of the plurality of codecs.

2. The medium as recited in claim 1, wherein determining the observed packet arrival rate ($I_o$) further includes: observing a packet length of packets included in the data stream.

3. The medium as recited in claim 1, wherein determining the observed packet arrival rate ($I_o$) includes: selecting an observation time frame and determining an observed number of packets that are received within the observation time frame.

4. The medium as recited in claim 1, wherein deriving the codec comprises:
   determining an observed time interval between receiving at least two packets in the data stream;
   comparing the observed time interval to a plurality of commonly used time intervals that are associated with a plurality of codecs, respectively;
   deriving the codec for decoding the data stream based on determining that the observed time interval matches a particular time interval associated with the codec.

5. The medium of claim 1, wherein deriving the codec comprises:
   determining an observed time interval between receiving at least two packets in the data stream;
   comparing the observed time interval to a plurality of commonly used time intervals that are associated with a plurality of codecs, respectively;
   selecting a particular time interval, of the commonly used time intervals, that is within a predetermined range of the observed time interval;
   deriving the codec, for decoding the data stream, that is associated with the particular time interval.

6. The medium as recited in claim 1, wherein determining an observed packet arrival rate ($I_o$) of the packets included in the data stream comprises determining an observed packet arrival rate of data packets of the packets included in the data stream.

7. A non-transitory computer readable medium comprising instructions which, when executed by at least one hardware processor, causes performance of operations comprising:
   receiving, by a network device, a data stream comprising packets, the network device including a hardware processor;
   based on an expected arrival rate of the packets in the data stream, determining an expected arrival time of a next packet in the data stream;
   wherein the expected arrival rate of the packets in the data stream is based on a commonly used time interval associated with a codec used for encoding or decoding the data stream;
   determining an actual arrival time of the next packet in the data stream;
   determining a difference between the expected arrival time of the next packet and the actual arrival time of the next packet;
   based on the difference between the expected arrival time of the next packet and the actual arrival time of the next packet, determining that at least one packet prior to the next packet was dropped.

8. A non-transitory computer readable medium comprising instructions which, when executed by at least one hardware processor, causes performance of operations comprising:
   receiving, by a network device, a data stream comprising packets, the network device including a hardware processor;
   based on an expected arrival rate of the packets in the data stream, determining an expected number of packets to be received in a particular period of time;
   wherein the expected arrival rate of the packets in the data stream is based on a commonly used time interval associated with a codec used for encoding or decoding the data stream;
   determining an actual number of packets received during the particular period of time;
   determining a difference between the expected number of packets and the actual number of packets;
   based on the difference between the expected number of packets and the actual number of packets, determining a lost number of packets.

9. A network device comprising:
   one or more hardware processors;
   the network device being configured to perform operations comprising:
   receiving a data stream comprising packets;
   observing a characteristic associated with the data stream,
   wherein observing the characteristic associated with the data stream includes determining an observed packet arrival rate ($I_o$) of the packets included in the data stream;
   deriving based at least in part on the observed packet arrival rate ($I_o$), a codec of a plurality of codecs at least for decoding the data stream;
   decoding the data stream using the derived codec of the plurality of codecs.

10. The network device as recited in claim 9, wherein determining the observed packet arrival rate ($I_o$) further includes: observing a packet length of packets included in the data stream.

11. The network device as recited in claim 9, wherein determining the observed packet arrival rate ($I_o$) includes: selecting an observation time frame and determining an observed number of packets that are received within the observation time frame.

12. The network device as recited in claim 9, wherein deriving the codec comprises:
   determining an observed time interval between receiving at least two packets in the data stream;
   comparing the observed time interval to a plurality of commonly used time intervals that are associated with a plurality of codecs, respectively;
   deriving the codec for decoding the data stream based on determining that the observed time interval matches a particular time interval associated with the codec.

13. The network device as recited in claim 9, wherein deriving the codec comprises:
   determining an observed time interval between receiving at least two packets in the data stream;
   comparing the observed time interval to a plurality of commonly used time intervals that are associated with a plurality of codecs, respectively;
   selecting a particular time interval, of the commonly used time intervals, that is within a predetermined range of the observed time interval;
   deriving the codec, for decoding the data stream, that is associated with the particular time interval.

14. The network device as recited in claim 9, wherein determining an observed packet arrival rate ($I_o$) of the packets included in the data stream comprises determining an observed packet arrival rate of data packets of the packets included in the data stream.

15. A network device comprising:
   one or more hardware processors;
   the network device being configured to perform operations comprising:
   receiving a data stream comprising packets;
   based on an expected arrival rate of the packets in the data stream, determining an expected arrival time of a next packet in the data stream;
   wherein the expected arrival rate of the packets in the data stream is based on a commonly used time interval associated with a codec used for encoding or decoding the data stream;
   determining an actual arrival time of the next packet in the data stream;
   determining a difference between the expected arrival time of the next packet and the actual arrival time of the next packet;
   based on the difference between the expected arrival time of the next packet and the actual arrival time of the next packet, determining that at least one packet prior to the next packet was dropped.

16. A network device comprising:
   one or more hardware processors;
   the network device being configured to perform operations comprising:
   receiving a data stream comprising packets;
   based on an expected arrival rate of the packets in the data stream, determining an expected number of packets to be received in a particular period of time;
   wherein the expected arrival rate of the packets in the data stream is based on a commonly used time interval associated with a codec used for encoding or decoding the data stream;
   determining an actual number of packets received during the particular period of time;
   based on a difference between the expected number of packets and the actual number of packets, determining a lost number of packets.

* * * * *